J. V. FRY.
TOOL HOLDER.
APPLICATION FILED AUG. 22, 1913.
1,104,980.
Patented July 28, 1914.
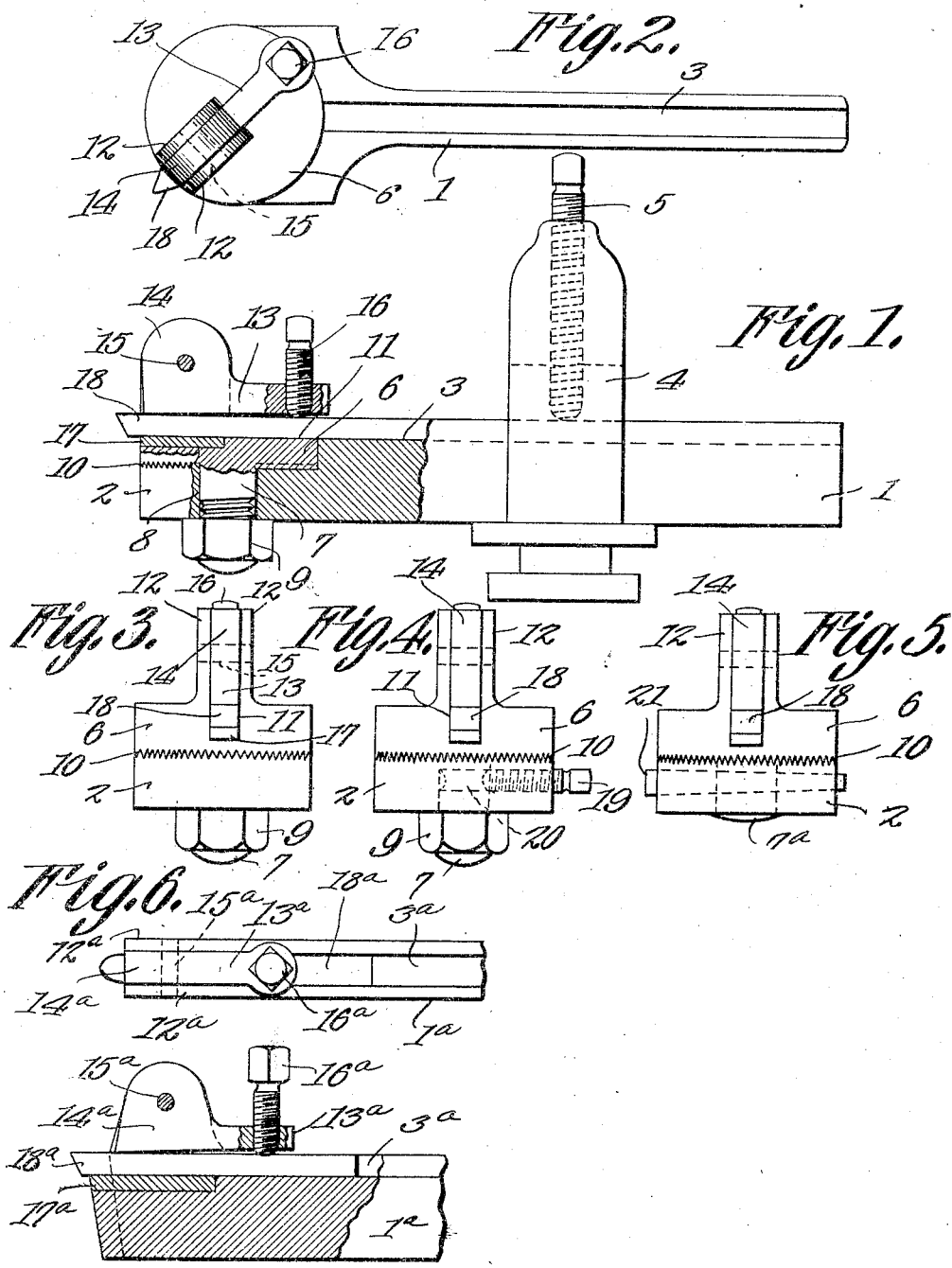

UNITED STATES PATENT OFFICE.

JOHN VALENTINE FRY, OF PHILLIPSBURG, NEW JERSEY.

TOOL-HOLDER.

1,104,980.  Specification of Letters Patent.  Patented July 28, 1914.

Application filed August 22, 1913. Serial No. 786,170.

*To all whom it may concern:*

Be it known that I, JOHN V. FRY, a citizen of the United States, residing at Phillipsburg, in the county of Warren and State of New Jersey, have invented a new and useful Tool-Holder, of which the following is a specification.

The present invention appertains to a tool holder for use on lathes, planers, shapers and the like, and aims to provide a novel and improved device of that character.

It is the object of the present invention to provide a tool holder adapted to be held by the ordinary tool post, and designed to hold a cutter or bit of various lengths, within practical limits, novel means being provided for clamping or locking the cutter or bit in position and for permitting the same to be adjusted as it becomes worn.

As a more specific object, the present invention contemplates the provision of a tool holder of the nature indicated, which shall also embody a turret for supporting the cutter or bit for oscillatory adjustments.

With the foregoing general objects outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiments in the accompanying drawing, wherein:—

Figure 1 is a side elevation of one form of the tool holder, partly broken away, and illustrating the same applied to a tool post. Fig. 2 is a plan view of the tool holder, illustrating the turret swung to bring the cutter or bit at an angular position with respect to the shank or stock of the holder. Fig. 3 is an end view of the holder. Figs. 4 and 5 are views, similar to Fig. 3, illustrating certain variations or alterations. Fig. 6 is a fragmental plan view of another form of the holder. Fig. 7 is a sectional view of the form of holder depicted in Fig. 6.

Referring specifically to Figs. 1, 2 and 3 of the drawing, which illustrate the turret type of tool holder, the numeral 1 designates the shank or stock of the holder, which may be of any suitable metal having the requisite tenacity. The shank 1 is formed at its forward end with a circular seat 2 which is flush with the bottom edge of the shank 1, and which is spaced below the upper edge of the shank. The upper edge of the shank is provided with a relatively deep longitudinal channel or groove 3 running from end to end. It is to be understood that the shank 1 is insertible into the ordinary tool post 4, as illustrated in Fig. 1, to be held or clamped by the binding or jamb screw 5.

Disposed upon the seat 2 is a solid circular turret 6, which has a central depending stem or shank 7 passing through a central eye or aperture 8 provided through the seat 2, a nut 9 being threaded on the lower end of the stem 7 to clamp the turret 6 upon the seat 2. The adjoining faces of the turret and seat are preferably provided with the interengageable radial corrugations or teeth 10, for locking the turret against rotation or oscillatory movements when the nut 9 is tightened. The upper face of the turret 6 is preferably flush with the upper edge of the shank 1, and is provided with a relatively deep diametrical channel or groove 11 adapted to register with the channel 3 of the shank 1. At the forward end of the channel 11, the turret 6 is provided with the upstanding ears 12 flush with the sides of the said channel, and a clamping or binding lever 13 is carried by the turret 6 above the channel 11, the lever 13 having an upstanding lug or ear 14 at its forward end fitting snugly between the ears 12 of the turret and pivoted between the said ears 12 by means of a pivot pin or rivet 15. The pivot or fulcrum pin 15 is disposed slightly in rear of the forward extremity of the lever 13, in order that when the rear end or tail of the lever is swung vertically, the forward end or corner of the lever will be moved correspondingly. A binding or jamb screw 16 is threaded through the rear end or extremity of the lever 13. The turret 6 is preferably provided with a hard metallic insert 17 forming the bottom of the forward end portion of the channel 11, the insert 17 being adapted to better resist the wear and tear incident to the clamping or holding of the cutter or bit, as will hereinafter appear.

The present holder is designed to receive the cutter or bit 18 constructed of a bar of suitable metal it being possible to construct the cutter or bit of various lengths within practical limits. Thus, when the channel 11 of the turret is alined with the channel 3 of the shank, the shank being disposed within the tool post 4, should the cutter or bit 18 be comparatively long, the same may fit snugly within the channels 3 and 11 with its forward end protruding slightly to engage the work or stock. When the binding screw 5 of the tool post is tightened, the same will engage the cutter or bit so as to not only clamp the shank 1 within the tool post, but to also clamp the cutter within the channel 3 of the shank. The forward end of the cutter will be clamped within the turret or the channel 11 thereof, by tightening the binding screw 16, which will cause the forward extremity of the cutter to be clamped tightly between the forward end of the lever 13 and the insert 17, it being noted that the binding screw 16 in engaging the cutter will also serve to clamp the cutter intermediate its forward end and the tool post. The cutter may thus be clamped at three points. Should a shorter cutter or bit be employed, that is, a cutter of a length not sufficient to extend under the binding screw 5 of the tool post, the cutter may be clamped by the forward end of the lever 13 and by the binding screw 16, without the assistance of the binding screw of the tool post. Or, if the cutter or bit is of a very short length, the same can be clamped between the insert 17 and the forward end of the lever 13, by threading the binding screw 16 downwardly so as to engage the bottom of the channel 11.

It will thus be manifest that the present holder is designed for use in connection with various lengths of cutters or bits, which is very desirable, and which will permit a long cutter to be continually used until worn out. In using a cutter or bit of the nature indicated, it will be evident that the same may be ground to shape at its forward end, in an easy and convenient manner, but little grinding being necessary, as compared with the ordinary tool now employed. The present cutter and holder may also be employed with effectiveness for making heavy cuts in the work or stock, and is otherwise of advantage as will be obvious to those versed in the art.

In employing the turret 6, the cutter or bit must be of a length to lie wholly within the channel 11 of the turret, which will permit the turret to be adjusted about its center, by loosening the nut 9. Thus, as illustrated in Fig. 2, the cutter may be adjusted angularly, when occasion may necessitate or dictate, the manner of clamping the cutter being the same as that above described.

An important advantage flowing from the particular structure described, resides in the fact that the cutter may fit completely within the relatively deep grooves of the turret and shank, which is highly desirable, and furthermore, the lever being pivoted between the ears at the sides of the turret groove, may swing into or enter the turret groove when the cutter is removed, or should the cutter be compartively thin, so as to lie below the surface of the turret. In this manner, the cutter may be securely held within the groove of the turret, and may be very effectively clamped therein.

As illustrated in Fig. 4, the turret 6 may be locked upon the seat 2 by means of a set screw 19 threaded into one side of the seat 2 and engaging an angular or circumferential groove 20 provided in the stem or shank 7 of the turret. Or, as illustrated in Fig. 5, the turret may be locked upon the seat 2, by means of a cotter pin or key 21 engaged through the seat 2 and the shank or stem 7 of the turret. It is evident that these or other means may be employed for locking the turret in position.

In the form illustrated in Figs. 6 and 7, the turret and attendant parts are eliminated, the shank $1^a$ being of approximately the same cross section from end to end, and having the longitudinal channel or groove $3^a$ in its upper edge extending from end to end. At the forward end of the channel $3^a$, the shank $1^a$ is provided with the upstanding ears $12^a$. A lever $13^a$ is disposed above the forward end portion of the channel $3^a$, and has the upstanding ear or lug $14^a$ pivoted between the ears $12^a$ by means of a pin or rivet $15^a$, a binding or clamping screw $16^a$ being carried by the rear end or extremity of the lever $13^a$. The shank $1^a$ is also preferably provided with the rear resisting insert $17^a$ forming the bottom of the forward end portion of the channel $3^a$. The cutter or bit $18^a$ may be of any desirable length, and is clamped within the channel $3^a$ in the manner stated in connection with the description of Figs. 1, 2 and 3.

The advantages of several forms of the invention above described, will be manifest to those versed in the art, and need not be itemized at length, it being noted that the objects aimed at have been carried out satisfactorily. For convenience in claiming the invention, the turret 6 may be considered a part of the shank 1, when the channel 11 of the turret is alined with the channel of the shank, so that generically, the forms illustrated all resemble each other.

Having thus described the invention, what is claimed as new is:—

A tool holder embodying a member having a relatively deep upper channel to snugly receive a cutter therein, and having a pair of upstanding ears at one end of and flush with the sides of the said channel, a lever disposed above the channel and having an upstanding ear at one end pivoted between the said ears, and a binding screw carried by the other end of the lever and arranged to engage the bottom of the channel or a cutter fitting in the channel, to clamp the cutter between the first mentioned end of the lever and the bottom of the channel.

In testimony that I claim the foregoing as my own, I have hereunto affixed my signature in the presence of two witnesses.

JOHN VALENTINE FRY.

Witnesses:
 M. D. JAYNE,
 EDWARD STYERS.